Patented Nov. 6, 1951

2,573,733

UNITED STATES PATENT OFFICE 2,573,733

PRODUCTION OF ANTHRAQUINONE DYESTUFFS

Victor S. Salvin, Irvington, and John R. Adams, Jr., Summit, N. J., assignors to Celanese Corporation of America, New York, N. Y., a corporation of Delaware No Drawing. Application January 3, 1950, Serial No. 136,650

20 Claims. (Cl. 260—379)

This invention relates to anthraquinone dyestuffs and relates more particularly to an improved process for the production of certain novel anthraquinone dyestuffs of the general formula:

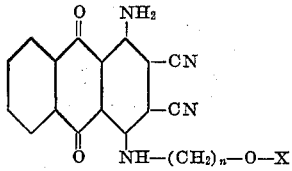

wherein $n$ is an integer of up to about 5 and X is an alkyl or hydroxyalkyl group. As examples of alkyl groups which may be present in said dyestuff there may be mentioned the methyl group, ethyl group, propyl group and isopropyl group, while examples of hydroxyalkyl groups are hydroxyethyl, hydroxypropyl and hydroxyisopropyl groups. These novel dyestuffs dye cellulose acetate or other organic derivative of cellulose textile materials in light to medium blue shades exhibiting a satisfactory resistance to acid fading.

The present application is a continuation-in-part of our copending application S. No. 115,768 filed on September 14, 1949.

The anthraquinone dyestuffs described above, and which form the basis of said copending application have heretofore been obtained by catalytically reacting the intermediate 1-amino-2-sulfo-4-brom-anthraquinone under suitable reaction conditions, with a hydroxyalkoxyalkyl amine or alkoxyalkylamine of the formula $NH_2(CR_2)_n$—O—X so that the 4-brom substituent is replaced by the amine, and then reacting the resulting 4-substituted-amino compound with an alkali metal cyanide whereby a cyano group replaces the 2-sulfo group and a second cyano group enters in the 3-position. The cyanation reaction is effected by dissolving the 1-amino-2-sulfo-4-substituted-amino anthraquinone in hot water with the aid of sodium bicarbonate, filtering the aqueous solution, adding an alkali metal cyanide to the filtrate and heating the reaction mixture thus obtained to a temperature of about 65 to 100° C. for about 3 to 16 hours. The reaction product as formed precipitates from solution and, when reaction is completed is filtered off. The dyestuff is then usually subjected to a purification treatment. Yields of only about 30 to 35% of theory of purified dyestuff are obtained by this process. Higher yields are necessary for commercial utilization of this process.

It is, therefore, an important object of this invention to provide an improved cyanation process in the production of the aforementioned novel anthraquinone dyestuffs whereby the dyestuffs are obtained in high yield and in a degree of purity sufficiently high to enable the dyestuff thus obtained to be employed without a separate purification step.

Other objects of this invention will appear from the following detailed description.

We have now found that anthraquinone dyestuffs of the formula

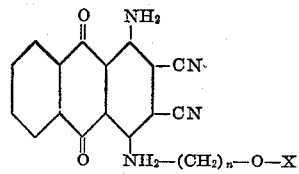

wherein $n$ is an integer of up to about 5 and X is an alkyl or hydroxyalkyl group may be obtained in markedly improved yield and in a form requiring no further purification if a buffer salt such as sodium or potassium dihydrogen phosphate is incorporated in the cyanation reaction mixture employed whereby the 1-amino-2-sulfo-4-substituted-amino anthraquinone intermediate is converted to the corresponding 2,3-dicyano compound.

Thus, in accordance with the process of the instant invention, the initial amination reaction wherein the 4-brom group is replaced, is usually effected in an aqueous medium employing a reaction temperature of about 50 to 95° C. and a reaction period of about 2 to 8 hours. Preferably, for each mol of the 1-amino-2-sulfo-4-brom anthraquinone undergoing reaction, we employ about 2 to 5 mols of the hydroxyalkoxyalkylamine or alkoxyalkylamine in forming the desired reaction mixture. The incorporation of an acid binder such as sodium carbonate during the amination reaction has now been found to be highly advantageous for increasing both the purity and yield.

As a suitable amination catalyst, we may employ cupric acetate, cuprous chloride, or activated copper powder. The catalyst is usually employed in an amount of from 0.02 to 0.1 mol for each mol of the substituted anthraquinone undergoing reaction. After reaction is completed and the excess amine is removed under vacuum, the reaction mixture is cooled and the mixture acidified with hydrochloric acid so as to precipitate the aminoanthraquinone intermediate as the hydrochloride. The precipitate, 1-amino-2-sulfo-4-substitutedamino anthraquinone, is filtered and then washed with dilute hydrochloric acid.

The novel cyanation step of our invention is carried out by dissolving the moist filter press cake in hot water with the aid of sodium bicarbonate, filtering the solution formed to remove any insoluble material, adding a buffer salt in the desired amount and, after the addition of the alkali metal cyanide, the reaction mixture thus formed is heated to a temperature of 75 to 90° C. and preferably, 80 to 85° C. for 12 to 16 hours. The 2-sulfo group is replaced by a cyano group during the above cyanation reaction and a second cyano group is also introduced in the 3-position. As the 2,3-dicyano-substituted product is formed, it precipitates from solution and may then be filtered off. Aeration of the reaction mixture by bubbling air therethrough prior to filtration serves to complete the reaction. This aeration step serves to convert any of the dyestuff present in the leuco form to the insoluble oxidized form. Not only does this aeration step serve to increase the yield but the oxidation thus effected converts the dyestuff to the optimum oxidation form for both affinity and shade. The reaction appears to go through a leuco form.

As examples of buffer salts which may be employed in our improved process, there may be mentioned salts such as sodium or potassium dihydrogen phosphate, or the sodium or potassium salts of citric or boric acid. The buffer salts are preferably present in the reaction mixture in an amount of from about 8.5 to 17 mols for each mol of the anthraquinone intermediate, while the alkali metal cyanide is preferably employed in an amount of from 8.5 to 17 mols for each mol of the anthraquinone intermediate present in the reaction mixture. The pH which the buffer salts maintain in the reaction medium is from about 9.2 to 9.5. As reaction proceeds and the 2,3-dicyano product precipitates from solution, the latter becomes progressively lighter in color. After completion of the cyanation reaction, the temperature of the resulting reaction mixture is lowered to about 60 to 70° C. and a stream of air is then bubbled through the mixture for about 1 to 2 hours to convert any of the leuco form of the dyestuff to the oxidized form. The reaction mixture is cooled and the dyestuff filtered off and washed with water. No further purification of the dyestuff is necessary.

In order further to illustrate our invention, but without being limited thereto the following example is given:

*Example*

A mixture of 100 parts by weight of 1-amino-2-sulfo-4-brom-anthraquinone, 90 parts by weight of β-methoxyethyl amine, 3 parts by weight of cupric acetate and 20 parts by weight of sodium carbonate are dissolved in 700 parts by weight of water and heated at 80 to 85° C. for eight hours. The mixture is then distilled under vacuum to remove water and unreacted amine. About 900 parts by weight of water are added and the diluted solution acidified with concentrated hydrochloric acid to precipitate the 1-amino-2-sulfo-4-β-methoxy-ethyl-amino-anthraquinone formed, as the hydrochloride. About 135 parts by weight of concentrated hydrochloric acid are employed. The solution is filtered and the filter cake washed with 2% aqueous hydrochloric acid at 25° C.

About 30 parts by weight of the hydrochloride of 1-amino-2-sulfo-4-β-methoxyethyl-amino anthraquinone thus obtained (90% purity) are added to 1500 parts by weight of water heated to a temperature of 60° C. and 7.5 parts by weight of sodium bicarbonate added slowly to adjust the pH to 6.8 and cause the anthraquinone intermediate to dissolve. The solution is filtered to remove any insoluble matter. 30 parts by weight of potassium dihydrogen phosphate are dissolved in the filtered solution and then 30 parts by weight of sodium cyanide are added. The resulting reaction mixture is heated at 85° C. for 10 hours with stirring. The 2,3-dicyano product formed separates during the course of the reaction and the blue color of the solution becomes progressively lighter. At the completion of the reaction, stirring is halted, the temperature of the reaction mixture reduced to 60 to 70° C. and air is bubbled through the mixture for one hour. The reaction mixture is then cooled and the precipitated dyestuff filtered off. A yield of 70% of theory of 1-amino-2,3-dicyano-4-β-methoxyethyl-amino anthraquinone is obtained. The product requires no further purification prior to use. The dyestuff dyes cellulose acetate textile materials in a medium greenish blue shade fast to light and washing and having a resistance to acid fading of 3 units in accordance with the standard A. A. T. C. C. test.

By carrying out the above cyanation reaction at 90 C. for 10 hours with 60 parts by weight of potassium dihydrogen phosphate being employed as the buffer salt, a yield of 80% of theory is obtained. No purification of the dyestuff thus obtained is necessary. The dyestuff, when dyed on cellulose acetate textile materials yields dyed materials similar to those obtained as described above but of a very slightly duller shade.

It is to be understood that the foregoing detailed description is given merely by way of illustration and that many variations may be made therein without departing from the spirit of our invention.

Having described our invention, what we desire to secure by Letters Patent is:

1. In a process for the production of anthraquinone dyestuffs of the following formula

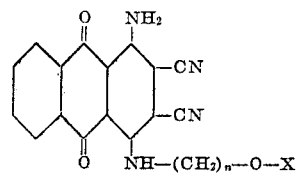

by catalytically reacting in an aqueous reaction medium 1-amino-2-sulfo-4-brom anthraquinone with an amine of the formula $$NH_2—(CH_2)_n—O—X$$

wherein $n$ is an integer of up to about 5 and X is a member of the group consisting of alkyl and hydroxyalkyl groups, and then subjecting the product obtained to a cyanation reaction with an alkali metal cyanide, the step which comprises effecting said cyanation reaction in an aqueous reaction medium containing a buffer salt in an amount sufficient to maintain said aqueous reaction medium at a pH from about 9.2 to 9.5.

2. Process in accordance with claim 1 wherein the buffer salt employed is potassium dihydrogen phosphate.

3. Process in accordance with claim 1 wherein the buffer salt employed is sodium dihydrogen phosphate.

4. Process in accordance with claim 1 wherein the buffer salt employed is sodium citrate.

5. Process in accordance with claim 1 wherein the buffer salt employed is sodium borate.

6. In a process for the production of anthraquinone dyestuffs of the following formula

[Structure: anthraquinone with O, NH₂, -CN, -CN, O, NH—(CH₂)ₙ—O—X substituents]

by catalytically reacting in an aqueous reaction medium 1-amino-2-sulfo-4-brom-anthraquinone with an amine of the formula $$NH_2—(CH_2)_n—O—X$$

wherein $n$ is an integer of up to about 5 and X is a member of the group consisting of alkyl and hydroxyalkyl groups, and then subjecting the product obtained to a cyanation reaction with an alkali metal cyanide, the step which comprises effecting said cyanation reaction in an aqueous reaction medium containing a buffer salt in an amount sufficient to maintain said aqueous reaction medium at a pH from about 9.2 to 9.5, employing a reaction temperature of 75 to 90° C. and continuing the reaction for 12 to 16 hours.

7. Process in accordance with claim 6 wherein the buffer salt employed is potassium dihydrogen phosphate.

8. Process in accordance with claim 6 wherein the buffer salt employed is sodium dihydrogen phosphate.

9. Process in accordance with claim 6 wherein the buffer salt employed is sodium citrate.

10. Process in accordance with claim 6 wherein the buffer salt employed is sodium borate.

11. In a process for the production of anthraquinone dyestuffs of the following formula

[Structure: anthraquinone with O, NH₂, -CN, -CN, O, NH—(CH₂)ₙ—O—X substituents]

by catalytically reacting in an aqueous reaction medium 1 - amino - 2 - sulfo - 4 - brom - anthraquinone with an amine of the formula $$NH_2—(CH_2)_n—O—X$$

wherein $n$ is an integer of up to about 5 and X is a member of the group consisting of alkyl and hydroxyalkyl groups, and then subjecting the product obtained to a cyanation reaction with an alkali metal cyanide, the step which comprises effecting said cyanation reaction in an aqueous reaction medium containing a buffer salt in an amount sufficient to maintain said aqueous reaction medium at a pH from about 9.2 to 9.5, employing a reaction temperature of 75 to 90° C. and continuing the reaction for 12 to 16 hours while employing 8.5 to 17 mols of the alkali metal cyanide for each mol of the anthraquinone intermediate undergoing reaction.

12. Process in accordance with claim 11 wherein the buffer salt employed is potassium dihydrogen phosphate.

13. Process in accordance with claim 11 wherein the buffer salt employed is sodium dihydrogen phosphate.

14. Process in accordance with claim 12 wherein 8.5 to 17 mols of the buffer salt are employed for each mol of the anthraquinone intermediate.

15. Process in accordance with claim 13 wherein 8.5 to 17 mols of the buffer salt are employed for each mol of the anthraquinone intermediate.

16. In a process for the production of 1-amino-2,3 - dicyano - 4 - β - methoxy - ethylamino-anthraquinone by catalytically reacting about one mol of 1-amino-2-sulfo-4-brom-anthraquinone with about 8 mols of β-methoxy-ethylamine in an aqueous reaction medium containing cupric acetate as catalyst, separating the 1 - amino - 2 - sulfo -4 - β - methoxy - ethylamino-anthraquinone formed and reacting the same with an alkali metal cyanide in an aqueous reaction medium, the step which comprises effecting said cyanation reaction at a temperature of about 75 to 90° C. for 12 to 16 hours in an aqueous reaction medium containing 8.5 to 17 mols of sodium cyanide and 8.5 to 17 mols of sodium dihydrogen phosphate for each mol of the 1 - amino - 2 - sulfo - 4 - β - methoxy - ethylamino-anthraquinone employed, said quantity of sodium dihydrogen phosphate being sufficient to maintain said aqueous medium at a pH from about 9.2 to 9.5 and separating 1-amino-2,3 - dicyano - 4 - β - methoxy - ethylamino-anthraquinone therefrom.

17. In a process for the production of 1-amino-2,3 - dicyano - 4 - β - methoxy - ethylamino-anthraquinone by catalytically reacting about one mol of 1-amino-2-sulfo-4-brom-anthraquinone with about 8 mols of β-methoxy-ethylamine in an aqueous reaction medium containing cupric acetate as catalyst, separating the 1 - amino - 2 - sulfo - 4 - β - methoxy ethylamino-anthraquinone formed and reacting the same with an alkali metal cyanide in an aqueous reaction medium, the step which comprises effecting said cyanation reaction at a temperature of about 75 to 90° C. for 12 to 16 hours in an aqueous reaction medium containing 8.5 to 17 mols of sodium cyanide and 8.5 to 17 mols of potassium dihydrogen phosphate for each mol of the 1-amino-2-sulfo-4-β-methoxy-ethylamino-anthraquinone employed, said quantity of sodium dihydrogen phosphate being sufficient to maintain said aqueous medium at a pH from about 9.2 to 9.5 and separating 1-amino-2,3-dicyano - 4 - β - methoxy - ethylamino - anthraquinone therefrom.

18. In a process for the production of 1-amino-2,3 - dicyano - 4 - β - methoxy - ethylamino-anthraquinone by catalytically reacting about one mol of 1-amino-2-sulfo-4-brom-anthraquinone with about 8 mols of β-methoxy-ethylamine in an aqueous reaction medium containing cupric acetate as catalyst, separating the 1 - amino - 2 - sulfo - 4 - β - methoxy - ethylamino-anthraquinone formed and reacting the same with an alkali metal cyanide in an aqueous reaction medium, the step which comprises effecting said cyanation reaction at a temperature of about 75 to 90° C. for 12 to 16 hours in an aqueous reaction medium containing 8.5 to 17 mols of sodium cyanide and 8.5 to 17 mols of sodium dihydrogen phosphate for each mol of the 1 - amino - 2 - sulfo - 4 - β - methoxy - ethylamino-anthraquinone employed, said quantity of sodium dihydrogen phosphate being sufficient to maintain said aqueous medium at a pH from about 9.2 to 9.5 bubbling air through the reaction mixture and separating 1-amino-2,3- dicyano - 4 - β - methoxy - ethylamino - anthraquinone therefrom.

19. In a process for the production of 1-amino-2,3 - dicyano - 4 - β - methoxy - ethylamine-anthraquinone by catalytically reacting about one mol of 1-amino-2-sulfo-4-brom-anthraquinone with about 8 mols of β-methoxy-ethylamine in an aqueous reaction medium containing cupric acetate as catalyst, separating the 1 - amino - 2 - sulfo - 4 - β - methoxy - ethylamino-anthraquinone formed and reacting the same with an alkali metal cyanide in an aqueous reaction medium, the step which comprises effecting said cyanation reaction at a temperature of about 75 to 90° C. for 12 to 16 hours in an aqueous reaction medium containing 8.5 to 17 mols of sodium cyanide and 8.5 to 17 mols of potassium dihydrogen phosphate for each mol of the 1 - amino - 2 - sulfo - 4 - β - methoxy-ethylamino-anthraquinone employed, said quantity of sodium dihydrogen phosphate being sufficient to maintain said aqueous medium at a pH from about 9.2 to 9.5 bubbling air through the reaction mixture and separating 1-amino-2,3 - dicyano - 4 - β - methoxy - ethylamino-anthraquinone therefrom.

20. In a process for the production of 1-amino-2,3 - dicyano - 4 - β - methoxy - ethylamine-anthraquinone by catalytically reacting about one mol of 1-amino-2-sulfo-4-brom-anthraquinone with about 8 mols of β-methoxy-ethylamine in an aqueous reaction medium containing cupric acetate as catalyst and sodium carbonate as an acid binding agent, separating the 1 - amino - 2 - sulfo - 4 - β - methoxy - ethylamino-anthraquinone formed and reacting the same with an alkali metal cyanine in an aqueous reaction medium, the step which comprises effecting said cyanation reaction at a temperature of about 75 to 90° C. for 12 to 16 hours in an aqueous reaction medium containing 8.5 to 17 mols of sodium cyanide and 8.5 to 17 mols of potassium dihydrogen phosphate for each mol of the 1 - amino - 2 - sulfo - 4 - β - methoxy-ethylamino-anthraquinone employed, said quantity of sodium dihydrogen phosphate being sufficient to maintain said aqueous medium at a pH from about 9.2 to 9.5 bubbling air through the reaction mixture and separating 1-amino-2,3 - dicyano - 4 - β - methoxy - ethylamino-anthraquinone therefrom.

VICTOR S. SALVIN.
JOHN R. ADAMS, Jr.

REFERENCES CITED

The following references are of record in the file of this patent:

UNITED STATES PATENTS

| Number | Name | Date |
|---|---|---|
| 1,938,029 | Kugel | Dec. 5, 1939 |
| 2,496,414 | Seymour et al. | Feb. 7, 1950 |

FOREIGN PATENTS

| Number | Country | Date |
|---|---|---|
| 306,963 | Great Britain | May 27, 1930 |
| 309,454 | Great Britain | July 10, 1930 |